Jan. 31, 1933.   S. T. KISER   1,895,573
WELDING ELECTRODE HOLDER
Filed April 22, 1932
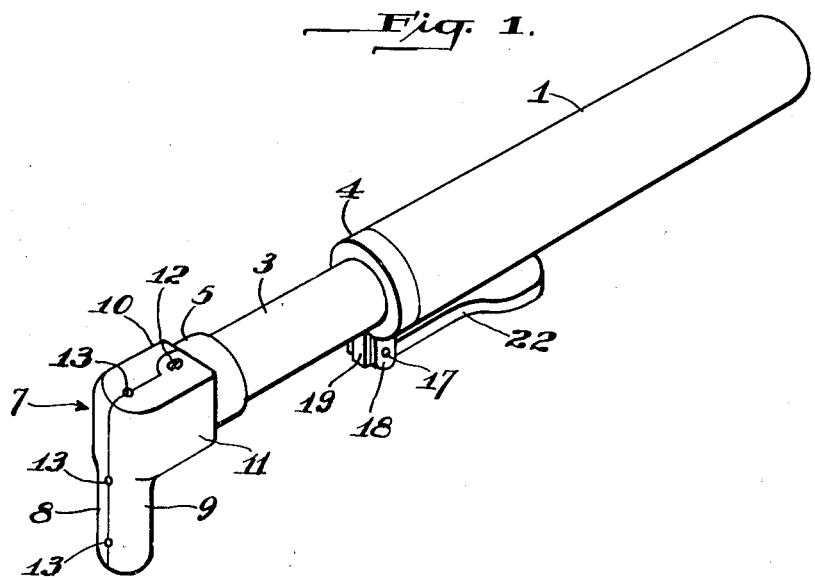
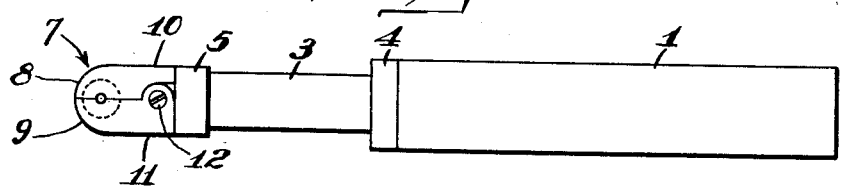
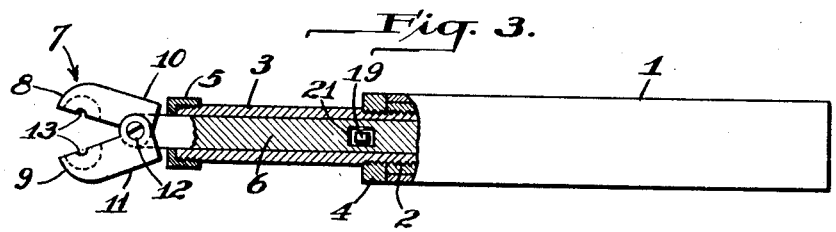
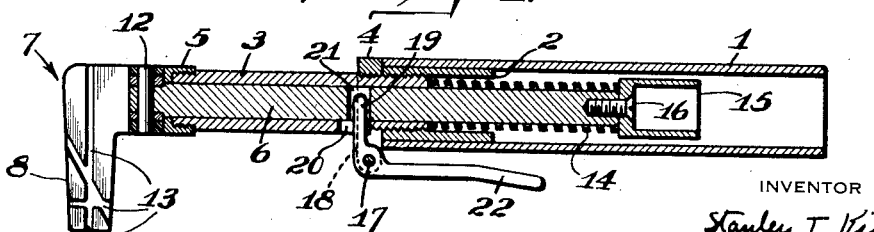
INVENTOR
Stanley T. Kiser
by Brown, Critchlow & Flick
his Attorneys
WITNESSES Patented Jan. 31, 1933

1,895,573

UNITED STATES PATENT OFFICE

STANLEY T. KISER, OF YOUNGSTOWN, OHIO

WELDING ELECTRODE HOLDER

Application filed April 22, 1932. Serial No. 606,771.

This invention relates to electric arc welding tools, and more particularly to manual electrode holders.

In the art of manual electric arc welding, a work piece is connected to one pole of an electric current supply, and an electrode holding tool is connected to the other. A welding wire or electrode is gripped by the electrode holder and held closely enough to the work piece to complete the circuit through an arc, the intense heat of which melts and fuses the work and electrode to form a weld. As the end of the welding wire fuses, the metal is deposited on the work piece, and the wire is moved forward to maintain the arc and supply more molten metal. Sometimes an imperfect weld is produced due to the fact that the electrode holder obstructs the welder's view of his work, or to the fact that the holder is not suited to position the electrode at such an angle that it can conveniently be fed to the arc by the operator.

It is among the objects of this invention to provide an electrode holder which does not obstruct the welder's view of his work, permits an electrode wire to be securely gripped at several selective angles, in which the jaw closing means is protected from the heat of the welding arc, and in which any part may quickly and easily be removed and replaced. Other objects and advantages will appear hereinafter.

The preferred embodiment of the invention is illustrated in the accompanying drawing of which Fig. 1 is a perspective view of an electrode holder; Fig. 2 a plan view thereof with the jaws in closed position; Fig. 3 a view similar to Fig. 2 but partly in section and with the jaws open; and Fig. 4 a side view in section.

Referring to the drawing, a tubular handle 1, made of suitable insulating material such as fibre or hard rubber, is provided at one end with an interiorly threaded reinforcing sleeve 2 frictionally retained therein. One end of a tube 3 is threaded through a fulcrum ring 4 and into sleeve 2 of the handle with ring 4 abutting against the handle, a bumper nut 5 being threaded on the opposite end of the tube. A rod 6 is slidably disposed in tube 3 with a portion of its length extending into the handle, and with its outer end carrying a head 7.

Head 7 comprises two elongate jaws 8 and 9 each having an integral end-portion 10 and 11, respectively, projecting at substantially a right angle therefrom. The inner faces of these end portions are so formed as to permit them to enclose and overlie the outer end of the rod to which they are pivotally connected by a removable pin 12 extending through apertures in them and a transverse aperture in the rod. The jaws thus project from the outer end of the rod at substantially a right angle, whereby their outer ends are disposed at one side of the rod and handle which places them in full and unobstructed view of the welder. The jaws are also tapered to permit them to be brought close to the work piece even though the latter is in a restricted position, and to further minimize the danger of the tool obstructing the welder's view of his work. It is preferable to make the head of copper which is not readily destroyed by melting or fusing during the welding process.

To aid in gripping a welding wire, the gripping face of each jaw is provided with a plurality of grooves 13 angularly disposed in relation to each other, the grooves of the two jaws cooperating in pairs to retain the wire therein at any one of a number of selectable angles, whereby the electrode holder can be held in various positions in accordance with the location of the welding area.

To normally retain the jaws in closed or gripping position, the portion of rod 6 within handle 1 is encircled by a coil spring 14 compressed between the inner end of tube 3 and an enlarged electric conduit coupling 15 which is secured to the end of the rod by any suitable means, such as by a screw 16. The spring constantly urges the rod inwardly of the handle, thereby drawing the end portions 10 and 11 of the jaws firmly against bumper nut 5 which forces the jaws together, as shown in Fig. 2.

The jaws are moved away from bumper nut 5, to permit them to open, by means of a bell crank lever pivotally mounted on removable pin 17 in a radial extension 18 of fulcrum ring 4. Short arm 19 of the lever projects through a longitudinal slot 20 in tube 3 outside of but adjacent to the end of the handle, and into a transverse opening 21 in rod 6. The long arm 22 of the lever extends along the handle in a position where it is readily grasped by the hand gripping the handle. By squeezing arm 22 against the handle, arm 19 is moved toward head 7, carrying rod 6 and the head with it and thereby freeing the jaw end-portions 10 and 11 from the bumper nut. When thus disengaged, the jaws are free to open.

It will be apparent from the drawing and description that this electrode holder is constructed from a number of simple but durable parts which can be quickly and readily disassembled and assembled in case a part needs to be replaced or repaired. Furthermore, the coil spring, which causes the jaws to normally grip an electrode wire, is disposed entirely within the handle where it is protected from the welding heat that would otherwise tend to weaken it. The head, in addition to having the advantages already pointed out, is adapted to hold welding wire electrodes of various sizes, and to permit the use of an electrode down to its very end.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. A welding electrode holder comprising an insulated handle, jaw-carrying means associated therewith, a pair of elongate jaws pivotally mounted at one end on the outer end of said means and extending therefrom at an angle, the gripping faces of the jaws being provided with a plurality of angularly disposed pairs of cooperating electrode-receiving grooves, resilient means for normally keeping the jaws closed, manually-operable means for releasing them, and means for connecting the jaws to an electric current supply.

2. The combination in a welding electrode holder comprising an insulated tubular handle, a metal rod slidably disposed therein, and means for connecting the rod to an electric current supply, of a pair of tapered elongate metal jaws pivotally mounted at one end on the outer end of the rod and extending therefrom at an angle, the gripping faces of the jaws being provided with a plurality of cooperating electrode-receiving grooves, and means adapted to selectively open and close said jaws.

3. A welding electrode holder comprising an insulated tubular handle, a rod slidably disposed therein, a pair of tapered elongate jaws pivotally mounted at one end on the outer end of the rod and extending angularly therefrom, the gripping faces of the jaws being provided with a plurality of angularly disposed pairs of cooperating electrode-receiving grooves, a coil spring disposed within the tubular handle for normally keeping the jaws closed, manually operable means for releasing the jaws, and means for connecting the jaws to an electric current supply.

4. A welding electrode holder comprising an insulated tubular handle, a tube secured to one end of the handle in axial alignment therewith, a rod slidably disposed in the tube and handle, jaws pivotally mounted on the outer end of the rod, the gripping faces of the jaws being provided with a plurality of angularly disposed pairs of cooperating electrode-receiving grooves, rod-actuating resilient means disposed entirely within the handle for constantly urging the jaws against the outer end of the tube to normally keep them closed, manually operable means for forcing the jaws away from the tube to permit them to open, and means for connecting the jaws to an electric current supply.

5. A welding electrode holder comprising an insulated tubular handle, a tube having one end secured in the handle in axial alignment therewith and provided with an unenclosed longitudinal slot, a metallic rod slidably disposed within the tube and handle and provided with a transverse opening opposite the tube slot, a pair of tapered elongate jaws having angularly disposed end portions pivotally mounted on the outer end of the rod, the gripping faces of the jaws being provided with a plurality of angularly disposed pairs of cooperating electrode-receiving grooves, an enlarged electric conduit coupling secured to the end of the rod within the handle, a coil spring encircling the rod and abutting against the inner ends of the tube and coupling to constantly urge the rod inwardly of the handle, thereby closing the jaws by drawing them against the outer end of the sleeve, a fulcrum member mounted on the tube, and a bell crank lever pivoted to the fulcrum member with its short arm projecting into said rod opening and with its long arm overlying the handle, whereby movement of the long arm toward the handle causes the rod to be forced outward to free the jaws from the tube, thereby leaving them free to open.

In testimony whereof, I sign my name.

STANLEY T. KISER.